United States Patent
Hejlsberg et al.

(10) Patent No.: US 7,500,224 B2
(45) Date of Patent: Mar. 3, 2009

(54) CODE BLUEPRINTS

(75) Inventors: Anders Hejlsberg, Seattle, WA (US); Eric A. Gunnerson, Bellevue, WA (US); Peter H. Golde, Bellevue, WA (US); Chris Anderson, Bellevue, WA (US); Scott M. Wiltamuth, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 486 days.

(21) Appl. No.: 10/285,849

(22) Filed: Nov. 1, 2002

(65) Prior Publication Data

US 2004/0088688 A1    May 6, 2004

(51) Int. Cl.
*G06F 9/44* (2006.01)
(52) U.S. Cl. .................. 717/122; 717/106; 717/137; 717/140
(58) Field of Classification Search ................ 717/106, 717/114–118, 136–143, 147, 122
See application file for complete search history.

(56) References Cited

U.S. PATENT DOCUMENTS

| | | | | |
|---|---|---|---|---|
| 6,175,837 | B1 * | 1/2001 | Sharma et al. | 707/103 Y |
| 6,360,223 | B1 * | 3/2002 | Ng et al. | 707/100 |
| 6,640,255 | B1 * | 10/2003 | Snyder et al. | 719/315 |
| 2003/0196168 | A1 * | 10/2003 | Hu | 715/513 |
| 2004/0015832 | A1 * | 1/2004 | Stapp et al. | 717/106 |

OTHER PUBLICATIONS

Sarkar, et al, Code generation using XML based document transformation, The server Side : Nov. 2001, pp. 1-20.*

Bischof, C.H. et al., "Implementation of Automatic Differentation Tools", *PEPM*, Jan. 14-15, 2002, 98-107.

Fernandez, M. et al., "Efficient Evaluation of XML Middle-ware Queries", *ACM Sigmod*, May 21-24, 2001, 103-114.

Florescu, D. et al., "XL: An XML Programming Language for Web Service Specification and Composition", *WWW*, May 7-11, 2002, 65-76.

Miyashita, K. et al., "Declarative Programming of Graphical Interfaces by Visual Examples", UIST, Nov. 15-18, 1992, 107-116.

Van Den Brand, M.G.J. et al., "Compiling Language Definitions: The ASF = SDF Compiler", *ACM Transactions on Programming Languages and Systems*, Jul. 2002, 24(4), 334-368.

Wadler, P., "How to Declare and Imperative", *ACM Computing Surveys*, Sep. 1997, 29(3), 240-263.

* cited by examiner

*Primary Examiner*—Tuan Q Dam
*Assistant Examiner*—James Rutten
(74) *Attorney, Agent, or Firm*—Woodcock Washburn LLP (57) ABSTRACT

A blueprint is described that provides a framework for writing a code generator. A blueprint translator translates the blueprint into one or more classes with source code. The newly generated code can then be compiled. If the user wishes to add additional functionality to a generated class, this is done in a separate source file. At compilation time, the compiler combines the generated class with the user's additions, as if they were written in a single class. Later, if the blueprint is ever changed, the generated code can safely be updated without overwriting the user's additions. Alternately, the user can embed his desired additions or changes directly into the blueprint (embedded code). In this manner, should the blueprint ever be re-compiled, the user's changes will still be present. The partial classes technique can be used in conjunction with the embedded code technique.

30 Claims, 4 Drawing Sheets

CODE BLUEPRINTS

FIELD OF THE INVENTION

This invention relates in general to the field of computer programming. More particularly, this invention relates to translator usage in declarative programming.

BACKGROUND OF THE INVENTION

In order to increase computer programmer productivity, there is a trend towards a more declarative style of programming and away from the traditional imperative style. In a declarative environment, a programmer tells the system a desired goal or object, but the programmer does not necessarily tell the system how to achieve that desired goal or object.

Programming tools today enable extensibility in the areas of frameworks and application programming interfaces (APIs), but do not provide extensibility in the area of declarative programming. While new frameworks can be constructed, these frameworks are interacted with through an imperative programming model; i.e., users must create subclasses, instantiate objects, set properties, call methods, etc.

An indication of the need for an extensible declarative programming model is the increasing reliance on wizards, templates, and automatic code generation. For example, Visual Studio .NET by Microsoft Corporation of Redmond, Wash., has code generators for Windows® Forms, strongly typed DataSets, and Web Service Proxies, all of which are declarative in nature but present no declarative programming model. A drawback of such automatically generated code is that if a user makes modifications to the automatically generated code, these modifications will be lost if the code is ever re-generated. Accordingly, there is a need for providing a user, such as a computer programmer or developer, with systems and methods for creating a declarative programming model.

SUMMARY OF THE INVENTION

The present invention is directed to "blueprints" which can be viewed as a declarative programming language, centering on users or design tools authoring documents written in a domain-specific language using a data format such as XML, and which are translated into code by translators. Using the blueprints model, authors of frameworks and APIs can provide not just functionality and components, but also domain-specific declarative programming models.

As one example of many contemplated and described herein, a file, such as a database mapping description or declaration, is authored by a user or a design tool in a particular data language in which a format can be defined, such as XML. Such an exemplary file is referred to as a blueprint (though a blueprint in accordance with the present invention is not limited to such an exemplary file) and in this example, declares a mapping from columns in a database table to fields in a class. This domain-specific information is then translated to another programming language using a blueprint translator. The newly generated code can then be compiled.

If the user wishes to add additional functionality to the generated class, this is done in a separate source file. At compilation time, the compiler combines the generated class with the user's additions, as if they were written in a single class (partial classes). Later, if the blueprint is ever changed, the generated code can safely be updated without overwriting the user's additions. Alternately, the user can embed his desired additions or changes directly into the blueprint (embedded code). In this manner, should the blueprint ever be re-compiled, the user's changes will still be present. The partial classes technique can be used in conjunction with the embedded code technique.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

Generally, a blueprint is a domain-specific declarative programming language and provides a framework for writing a code generator. A blueprint translator translates the blueprint into one or more classes with source code. The newly generated code can then be compiled.

If the user wishes to add additional functionality to a generated class, this is done in a separate source file. At compilation time, the compiler combines the generated class with the user's additions, as if they were written in a single class (partial classes). Later, if the blueprint is ever changed, the generated code can safely be updated without overwriting the user's additions. Alternately, the user can embed his desired additions or changes directly into the blueprint (embedded code). In this manner, should the blueprint ever be re-compiled, the user's changes will still be present. The partial classes technique can be used in conjunction with the embedded code technique.

Several examples of blueprints and their use are described herein. The invention is not limited to these examples. An example of a blueprint is a file that declares a mapping from columns in a database table to fields in a class. Moreover, blueprints can be used with the ASP.NET programming model, produced by Microsoft Corporation. Blueprints allow the ASP.NET markup-and-code paradigm to be extended to other domains such as user interfaces, database mapping, web services, and compiled extensible stylesheet language (XSL) transforms.

Exemplary Computing Environment

Figure 1:
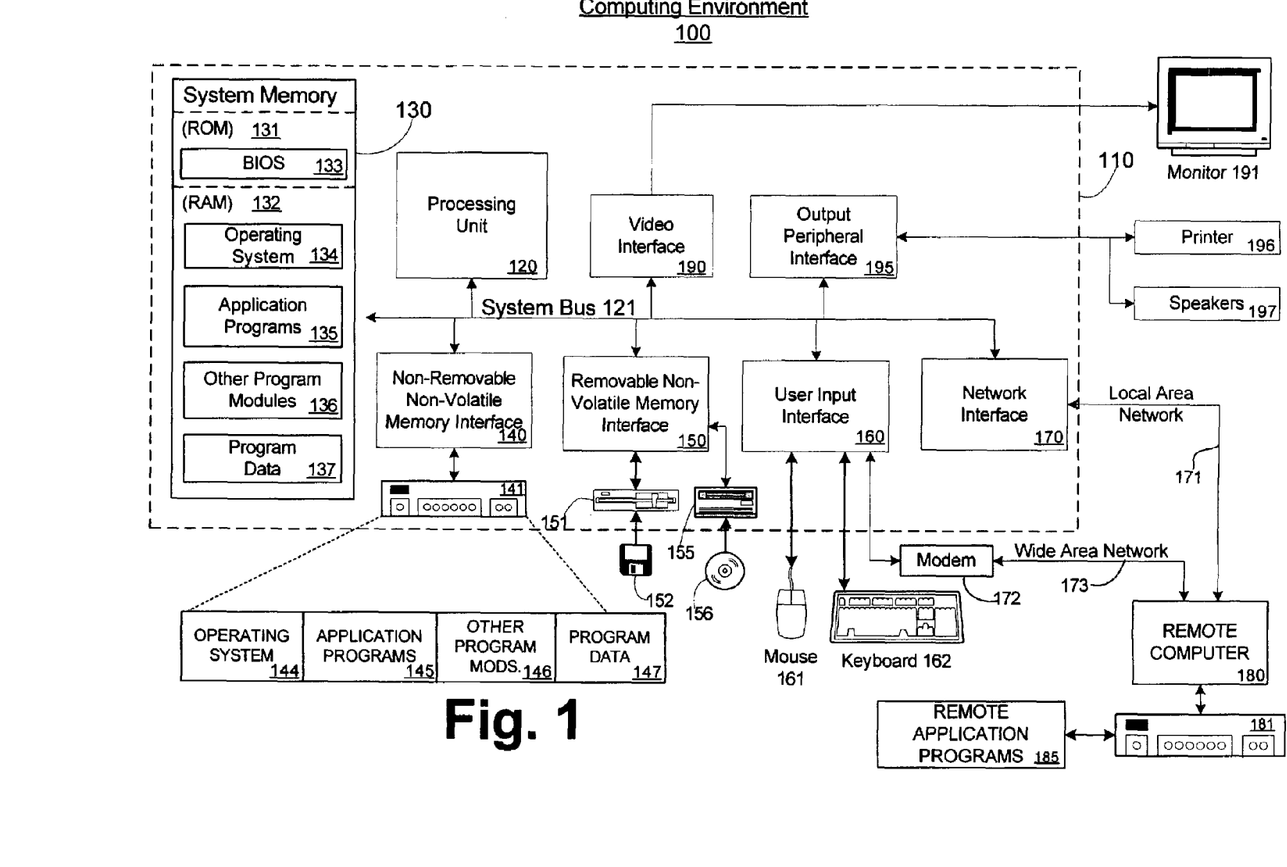
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or a "middle man" object between a coprocessor and requesting object, such that services may be performed by, supported in, or accessed via all of .NET's languages and services, and in other distributed computing frameworks as well.

Exemplary Embodiments

When a user starts working on a blueprint, the initial state preferably comes from a template description that is either based upon an existing file or generated by the designer. This is typically an "empty form" level of expression, although a designer could present a wizard to generate the correct information. The blueprint is used as the persistence format for the designer, and the designer can read/write it as desired. The project system is used in choosing the template and/or designer for a specific task. Once the designer has created a new file, the project system adds it to the current project, and then determines which blueprint translator to use for that blueprint.

Figure 2:
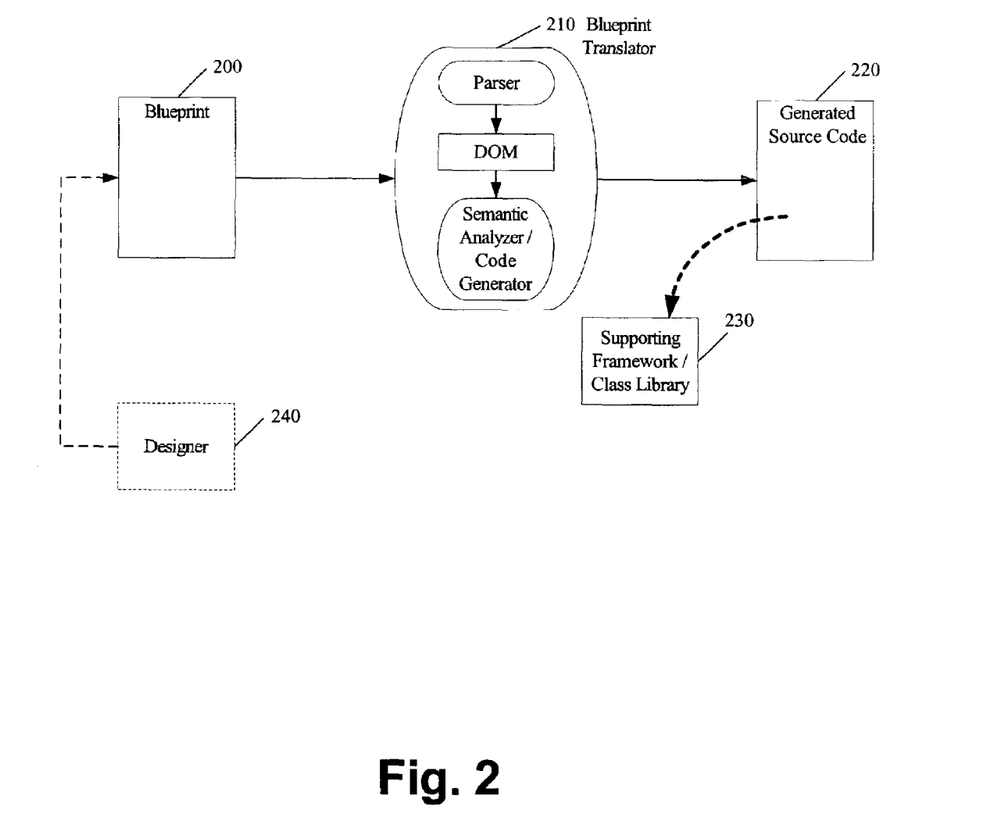
FIG. 2 is a diagram of an exemplary system in accordance with the present invention.

FIG. 2 shows an exemplary system in which a blueprint 200 is provided to a blueprint translator 210 which generates source code 220. The blueprint can be created or edited, for example, using an optional designer 240. Upon receiving the blueprint 200, the blueprint translator 210 parses the blueprint (using, e.g., an XML parser), and provides the parsed blueprint to a Document Object Model (DOM) for further processing. The output of the DOM is provided to a semantic analyzer and code generator. Source code 220 is thereby generated in accordance with predetermined schemas, patterns, and/or hierarchical rules, for example. The source code 220 may access or point to a supporting framework or class library 230. Preferably, the generated source code 220 is a read only file that cannot be modified. If it is desired to customize or otherwise modify the source code, a code snippet can be provided directly from the blueprint 200 to the source code 220 or the partial classes technique, described herein, can be used, for example.

Figure 3:
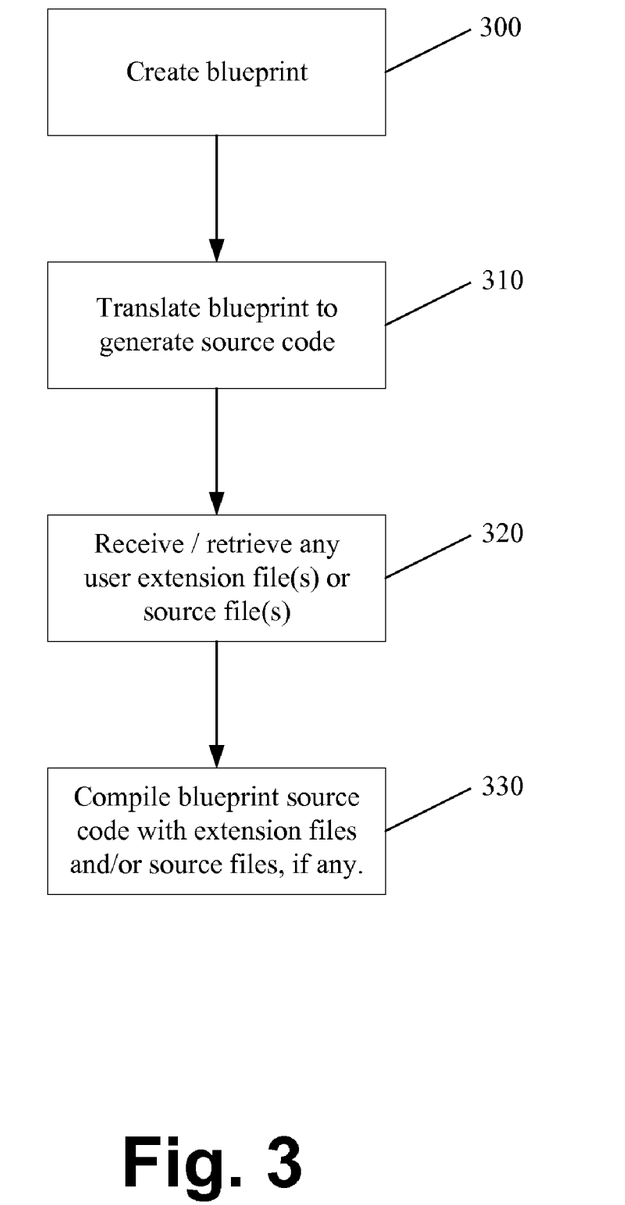
FIG. 3 is a flow diagram of an exemplary method of implementing a blueprint in accordance with the present invention.

FIG. 3 shows an exemplary method of implementing the blueprints technique. At step 300, a blueprint is created. The blueprint is translated into source code using a blueprints translator at step 310. The source code is then combined with a user extension file or source file, if one has been previously created, at step 320. The source code, and optional user extension file and/or source file, are then compiled at step 230, to create object code for subsequent use The interfaces and attributes that are implemented by blueprint translators and their hosts are now described. It is noted that the interfaces and classes described in this section are examples of how the present invention could be implemented, but the invention is not limited thereto. A blueprint translator is a class that implements an "IBlueprintTranslator" interface, an example of which is:

```
public interface IBlueprintTranslator
{
        void Translate(IBlueprintHost host);
}
```

A blueprint translator class provides a public parameterless constructor and has one or more "BlueprintTranslatorAttribute" attributes attached to it.

The Translate method is invoked by the host to translate one or more blueprints. The host parameter allows the translator to obtain information from the host, such as the input stream(s) to translate and an implementation for the target language.

A class that implements a blueprint translator preferably has one or more BlueprintTranslatorAttribute attributes attached to it, as shown below.

```
[AttributeUsage(AttributeTargets.Class, AllowMultiple = true)]
public class BlueprintTranslatorAttribute: Attribute
{
    public BlueprintTranslatorAttribute(string FileExtension) { . . . }
    public string Description { get { . . . } set { . . . } }
    public string FileExtension { get { . . . } }
}
```

The FileExtension parameter specifies the file extension for a type of blueprint document that can be translated by this translator. The Description parameter is an optional description of the type of blueprint documents associated with the given file extension An "IBlueprintHost" interface represents the host of a blueprint translator. When the host calls the Translate method of a blueprint translator's IBlueprintTranslator interface, it passes an instance of this interface to the translator, as shown below.

```
public interface IBlueprintHost
{
    IBlueprintInput[ ] GetInputs( );
    Assembly[ ] LoadReferencedAssemblies( );
    TextWriter CreateAdditionalOutput( );
    TextWriter CreateAdditionalOutput(string name);
    Stream CreateResource(string name);
    void CreateResource(string name, byte[ ] data);
    CodeDomProvider GetCodeDomProvider( );
    string GetBuildOutputPath( );
    void Error(string message, string filename, int line, int col);
    void Warning(string message, string filename, int line, int col);
}
```

A blueprint translator uses the GetInputs method to obtain an array of inputs to be translated. Each element is an instance of the IBlueprintInput interface from which an input stream can be obtained and an output TextWriter can be created.

The LoadReferencedAssemblies loads the assemblies that are referenced in the project or compilation and returns an array of Assembly objects. The CreateAdditionalOutput methods create an output source file for which there was no directly referenced input blueprint. Typically, the output source file for a blueprint is created using the CreateOutput method of the IBlueprintInput interface, but in cases where an output source file has no directly corresponding input, the CreateAdditionalOutput methods can be used. This is useful, for example, when a blueprint references another document (e.g., an "include" file) for which a separate output source file is to be created. If the name parameter is specified, it directs the host to name the output source file accordingly.

The CreateResource methods are used to create resources in the executable being produced by the host compiler. The GetCodeDomProvider method returns a CodeDomProvider instance for the target programming language. Using the CodeDomProvider, the input blueprints can be transformed to source code in a language independent fashion. The GetBuildOutputPath method returns the "output directory" for the compilation in progress. A blueprint translator that produces non-source outputs should place those outputs in this directory. The Error and Warning methods are used to report errors and warnings.

An "IBlueprintInput interface", shown below, represents an input blueprint to be translated.

```
public interface IBlueprintInput
{
    string GetInputFileName( );
    Stream OpenInput( );
    TextWriter CreateOutput( );
}
```

The GetInputFileName returns the filename of the blueprint. This filename is preferably used when reporting errors and warnings. In certain in-memory scenarios, the file is not used. The OpenInput method creates a stream from which the blueprint can be read. Preferably, a blueprint translator will create an "XML TextReader" on top of this stream. The CreateOutput method creates a TextWriter to which the translator can write the source code generated for the blueprint.

As an example, consider an Object Relational Database framework that maps database tables into classes. The framework provides the desired infrastructure to perform database access. In addition, the framework defines a file extension, .dbml, and includes a blueprint translator that can translate .dbml files containing XML-formatted mapping descriptions into source code that targets the framework. An exemplary .dbml blueprint is generated by a user or a design tool and is shown below.

```
<dbml>
    <database name="nwind" provider=". . ."/>
    <class name="Northwind.Customer" table="Customers">
        <property name= "Id" column = "CustomerID" primarykey = "true"/>
        <property name= "Name" column = "ContactName"/>
        <property name= "Title" column = "ContactTitle"/>
        <property name= "Company" column = "CompanyName"/>
        <property name= "Phone" column = "Phone"/>
        <property name= "Address" column = "Address"/>
        <collection name= "Orders" relation= "CustOrders"/>
    </class>
    . . .
    <relation name="CustOrders" parentClass="Customer" childClass="Order">
        <key parent="Id" child="CustomerId"/>
    </relation>
    . . .
</dbml>
```

The blueprint first identifies the database to map (in this case, the "nwind" database). The blueprint then describes how each table in the database is mapped onto a class. Here, only one of the table mappings is shown, mapping the Customers table in the database to a Customer class in the Northwind namespace. Further details of the mapping include the CustomerID column that maps to an Id property, the ContactName column that maps to a Name property, etc. Additionally, the blueprint calls for an Orders collection to be generated in the Customer class based on the relation between the Customer and Order classes described in the <relation> element.

It is contemplated that additional tags could be placed inside the <class> element; for example, a <query> tag that allows the user to specify a SQL query for which a strongly typed method is created, or, a <code> tag that allows source code to be directly injected into the generated class.

A blueprint like the one set forth above would typically be generated by a database design tool, but it could also be authored manually or created by an XML transformation. The Object Relational Database framework provides a definition of a single declarative format and a blueprint translator that can translate that format into imperative source code.

For the .dbml blueprint above, the blueprint translator would generate the following source code:

```
namespace Northwind
{
    public class Customer
    {
        public Customer( ... ) { ... }
        public string Id { ... }
        public string Name { ... }
        public string Title { ... }
        public string Company { ... }
        public string Phone { ... }
        public string Address { ... }
        public OrderCollection Orders { ... }
    }
    ...
}
```

The generated Customer class contains the requested members and has been placed in the Northwind namespace. The code that accesses the database is represented by the {...} blocks.

It is contemplated that in the normal course of programming, the programmer will not see the code generated by blueprints. Moreover, it is contemplated that blueprint translators have the ability to generate code in a variety of languages.

The present invention can be used with a variety of programming language compilers (e.g., Visual Basic, Visual C#, Visual C++, etc.), Visual Studio, and the ASP.NET application, for example. A user provides a blueprint file to a compiler and the compiler will invoke the appropriate blueprint translator and then compile the source code that was produced by the translation. Preferably, this additional step is transparent to the user. Desirably, it looks to the user as if the compilers understand blueprints just as well as regular source files. For example, to compile a program consisting of a C# source file, main.cs, and an Object Relational Database blueprint, data.dbml, two files are passed to the Visual C# command-line compiler, as follows:

C:\>csc main.cs data.dbml

To "notify" a compiler about the existence of a specific blueprint translator, the assembly that contains the translator is referenced. When loading the referenced assemblies, the compiler looks for classes that implement the IBlueprint-Translator interface and, based on BlueprintTranslator attributes attached to those classes, the compiler can determine which file extensions are supported and which translators to use. Staying with the example, the Object Relational Database framework contains a blueprint translator for .dbml files:

```
[BlueprintTranslator(".dbml")]
public class DbmlBlueprintTranslator: IBlueprintTranslator
{
    void Compile(IBlueprintHost host) { ... }
}
```

Generally, a blueprint translator is a piece of managed code that consumes a stream of input and produces a stream of output. There is no requirement that the input be XML or even human readable text. The input can in principle be anything. However, the output of a blueprint translator is preferably source code in the language requested by the host.

For example, a blueprint translator (further described above with respect to FIG. 2) can use an XML parser (such as System.Xml.XmlTextReader) or an XML DOM (such as System.Xml.XmlDocument) to process the input. Likewise, a blueprint translator can use the CodeDOM (an object model for abstract syntax trees and code generation provided in the System.CodeDom namespace) to generate source code in a language-neutral fashion.

Many conventional code generation solutions suffer from the "one-way street problem" in which the code generator only generates part of the required code and the programmer is expected to add the missing pieces; but when the programmer does so, it becomes impossible to ever run the code generator again because the programmer's changes would then be lost. The source code produced by a blueprint translator is not intended to be modified by the user. Instead, when appropriate, blueprint translators will allow user-written code to be embedded in the markup. Further flexibility in customizing the generated code is provided through partial classes, described herein. Embedded code and partial classes avoid the one-way street problem.

With respect to embedded code, returning to the example set forth above, assume that a user desires to add some higher order business logic to the Customer class that gets generated by the .dbml blueprint. For example, assume the user desires a method to check whether the customer's credit limit has been exceeded, and another method that determines if the customer has any outstanding orders. The .dbml translator allows such code to be directly embedded in the markup below:

```
<dbml>
    <database name="nwind" provider="..."/>
    <class name="Northwind.Customer" table="Customers">
        <property name="Id" column = "CustomerID" primarykey = "true"/>
        <property name= "Name" column = "ContactName"/>
        <property name= "Title" column = "ContactTitle"/>
        <property name= "Company" column = "CompanyName"/>
        <property name= "Phone" column = "Phone"/>
        <property name= "Address" column = "Address"/>
        <collection name= "Orders" relation= "CustOrders"/>
        <code>
            public void CheckCreditLimit( ) {
                if (Orders.Total > MaxCredit) { ... }
            }
            public bool HasOutstandingOrders( ) {
                return Orders.Count > 0;
            }
        </code>
    </class>
    ...
</dbml>
```

In .dbml blueprints, text contained in <code> elements is copied to the source code generated by the translator. This provides seamless mixing of declarative markup and imperative source code. Blueprints allow this model to be leveraged across other domains.

The generated code for the exemplary blueprint now looks like this:

```
namespace Northwind
{
    public class Customer
    {
        public Customer( ... ) { ... }
        public string Id { ... }
        public string Name { ... }
        public string Title { ... }
        public string Company { ... }
        public string Phone { ... }
        public string Address { ... }
        public OrderCollection Orders { ... }
#line 16 "data.dbml"
        public void CheckCreditLimit( ) {
            if (Orders.Total > MaxCredit) { ... }
        }
        public bool HasOutstandingOrders( ) {
            return Orders.Count > 0;
        }
#line default
    }
    ...
}
```

The #line directives cause debugger source line information to reference the original .dbml file instead of the generated source code. Thus, when stopped in the CheckCreditLimit and HasOutstandingOrders methods, the debugger will display the code in the .dbml file.

Although embedding code in blueprints is desirable for small snippets of code, it is often desirable to keep larger sections of code in a separate file. "Partial classes" allows this separation to be maintained. Partial classes permit the code for a class to be distributed among multiple class declarations. At compile time, the compiler merges these separate pieces into a single class. To prevent accidental merging, the compiler preferably requires each partial class fragment to include a partial keyword in the class declaration.

To use a separate partial class for the business logic code in the example described herein, a request is made that the blueprint translator generate a partial Customer class. For example, the Object Relational Blueprint translator might permit a modifiers attribute to be specified on the class element as follows:

```
<dbml>
    <database name="nwind" provider="..."/>
    <class name="Northwind.Customer" table="Customers" modifiers=
        "partial">
        ...
    </class>
</dbml>
```

The modifiers attribute would cause the generated class to have the specified partial modifier:

```
namespace Northwind
{
    public partial class customer
    {
        ...
    }
}
```

The business logic methods can be applied to a partial class in a separate source file as shown below:

```
namespace Northwind
{
    public partial class customer
    {
        public void CheckCreditLimit( ) {
            if(Orders.Total > MaxCredit) { ... }
        }
        public bool HasOutstandingOrders( ) {
            return Orders.Count > 0;
        }
        ...
    }
}
```

At compile time, the compiler merges the class fragment generated by the blueprint and the class fragment in the separate source file into a single class, and the resulting compiled code is preferably indistinguishable from that produced with code snippets embedded in the blueprint.

Partial classes allow a user to manually change the generated code, and have these manual changes preserved should the code be re-generated. Thus, partial classes support both a "code within" and a "code behind" model with the same infrastructure.

Another example, a "Hello World" application, is now described using blueprints. There are three files in the exemplary application: (1) "hello.wfml", a Windows® Forms Markup Language blueprint which defines the application's user interface; (2) "hello.resx", a .NET Resource File blueprint which defines the resources of the application; and (3) hello.cs, a typical (C#) source file which contains the main entry point of the application.

The hello.wfml file is a Windows® Forms blueprint:

```
<Module xmlns="using:System.Windows.Forms"
    xmlns:sys="using:System"
    xmlns:code="codegen:C#">
    <Form code:ClassName="HelloForm" Text="Blueprints" Font="Arial,24px">
        <Label Id="Heading" Text="Hello World" TextAlign="MiddleCenter"
            Dock="Fill" ForeColor="Blue"/>
        <Button Id="OkButton" Text="OK" Click="OkButtonClicked"
            Dock="Bottom" Height="40"/>
        <code:Source>
            void OkButtonClicked(object sender, EventArgs e) {
                MessageBox.Show(Resources.Message, Resources.Title);
            }
        </code:Source>
```

```
    </Form>
</Module>
```

In this blueprint, the first two xmlns attributes on the Module tag map XML tag names onto .NET namespaces. In this example, the xmlns attributes establish System.Windows.Forms as the namespace for XML tag names with no prefix, and System as the namespace for XML tags with a sys prefix.

The tags of a .wfml blueprint correspond to .NET classes and the attributes of the tags correspond to properties of those classes. Thus, when combined with the XML namespace mapping, the Form, Label, and Button tags represent the Form, Label, and Button classes in the System.Windows.Forms namespace.

The code:ClassName attribute in the Form tag indicates that a subclass of Form named HelloForm is being declared. The code:Source tag causes the contained code to be emitted directly into the generated class. The references to Resources.Message and Resources.Title in the OkButtonClicked event handler are resource strings that are specified in the hello.resx blueprint.

The Windows® Forms blueprint translator generates the following code for the hello.wfml file. Preferably, this step is automatic, and, unless requested, the user does not see this generated code.

```
using System;
using System.Windows.Forms;
public class HelloForm: System.Windows.Forms.Form
{
    private System.Windows.Forms.Label Heading =
        new System.Windows.Forms.Label( );
    private System.Windows.Forms.Button OkButton =
        new System.Windows.Forms.Button( );
#line 5 "test.wfml"
    void OkButtonClicked(object sender, EventArgs e) {
        MessageBox.Show("This is a test", "Hello");
    }
#line default
    public HelloForm( ) {
        this.InitializeComponent( );
    }
    private void _element_init_Heading_2
        System.Windows.Forms.Control _parent) {
        System.Windows.Forms.Label _element;
        _element = this.Heading;
        _element.Parent = _parent;
        _element.Text = "Hello World";
        _element.TextAlign = ((System.Drawing.ContentAligmnent)(32));
        _element.Dock = ((System.Windows.Forms.DockStyle)(5));
        _element.ForeColor = System.Drawing.Color.Blue;
    }
    private void _element_init_ OkButton_3(
        System.Windows.Forms.Control _parent) {
        System.Windows.Forms.Button _element;
        _element = this.OkButton;
        _element.Parent = _parent;
        _element.Text = "OK";
        _element.Click += new System.EventHandler(this.OkButtonClicked);
        _element.Dock = ((System.Windows.Forms.DockStyle)(2));
        _element.Height = 40;
    }
    private void _element_init_this_1(
        System.Windows.Forms.Control _parent) {
        System.Windows.Forms.Form _element;
        _element = this;
        _element.Text = "Blueprints";
        _element.Font = new System.Drawing.Font("Arial", 24F,
            ((System.Drawing.FontStyle)(0)),
            ((System.Drawing.GraphicsUnit)(2)));
        this._element_init_Heading_2(_element);
        this._element_init_OkButton_3(_element);
    }
    private void InitializeComponent( ) {
        this._element_init_this_1(null);
    }
}
```

It should be noted that compared to the generated code, the declarative blueprint is much closer in nature to the hierarchical display tree it is describing.

The hello.resx file is an exemplary .NET Resource file as follows:

```
<Resources ClassName="Resources">
    <Resource Name="Title" Value="Resource test"/>
    <Resource Name="Message" Value="This string is a resource"/>
</Resources>
```

The Resource blueprint translator generates the following code for the hello.resx file:

```
public class Resources
{
    public static string Title {
        get {
            return (string)GetManager( ).GetObject("Title");
        }
    }
    public static string Message {
        get {
            return (string)GetManager( ).GetObject("Message");
        }
    }
    private static System.Resources.ResourceManager manager;
    private static System.Resources.ResourceManager GetManager( ) {
        if (manager == null) {
            manager = new System.Resources.ResourceManager(
                typeof(Acme.Enterprises.Resources));
        }
        return manager;
    }
}
```

The Resource blueprint translator generates a read-only static property for each named resource. Each property accessor delay-creates a resource manager and then uses the resource manager to fetch the data from the executable.

The hello.cs file is a source file (e.g., in C#) that contains the entry point of the application:

```
using System.Windows.Forms;
class Hello
{
    static void Main( ) {
        Application.Run(new HelloForm( ));
    }
}
```

The Main method creates an instance of HelloForm and displays it as the main window of the application. Even though HelloForm was written as a Windows® Forms blueprint, it is referred to and instantiated in the same way as a regular class.

To compile the "Hello World" application, the three files are passed to the command-line compiler (e.g., a C# compiler) (along with the appropriate assembly references):

C:\blueprints>csc hello.cs hello.wfml hello.resx

Figure 4:
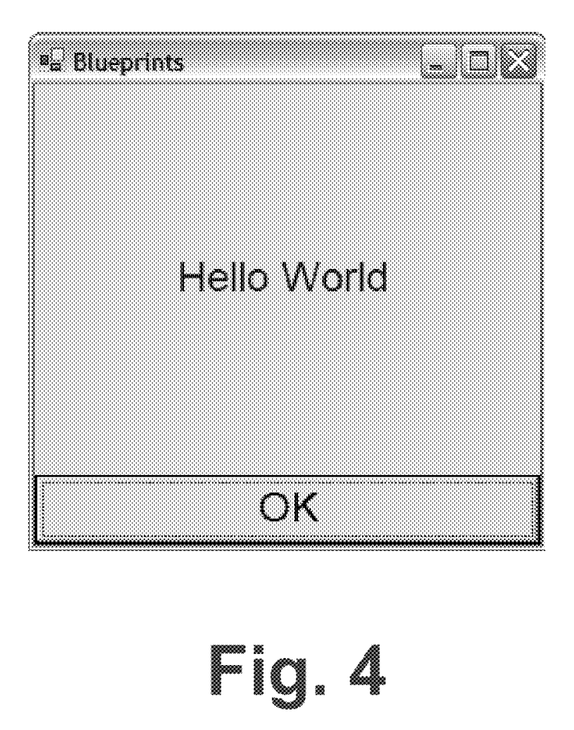
FIG. 4 is a diagram of a portion of an exemplary screenshot described in accordance with an example useful in describing the present invention.
Figure 5:
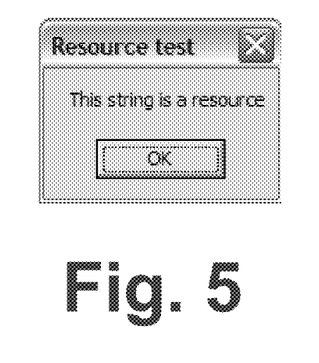
FIG. 5 is a diagram of a portion of an exemplary screenshot described in accordance with an example useful in describing the present invention.

The result of the compilation is an executable, hello.exe. When hello.exe is executed, it creates and displays an instance of the HelloForm class, shown in FIG. 4. When the OK button is pressed, the OkButtonClicked event handler is invoked. It fetches the Message and Title strings from the application's resources and displays a message box, shown in FIG. 5.

For an implementation in MICROSOFT®'s Visual Studio, when a blueprint file is added to a project, the project system will invoke the appropriate blueprint translator to produce the corresponding source code (the project system can determine which translator to use by examining the assemblies referenced by the project). This source code is cached and re-generated every time the blueprint is modified. Other parts of the system can view the blueprint as another source file in the native language of the project. In particular, the background compiler can parse the generated source code and provide statement completion in code that uses the blueprint.

Relating this to the Object Relational Blueprint example, any code that uses the Customer class will see statement completion for the members of the class. Indeed, even when the user is writing the partial Customer class that contains the business logic methods, statement completion is available for the parts of the class that were generated by the blueprint.

Preferably, designers in Visual Studio will use a domain-specific blueprint format for persistence.

Thus, using the present invention, domain-specific programming models can be created. The present invention can be applied to a wide variety of technologies, such as client UI, server UI, database mapping, resources and localization, web services, business process modeling, enterprise software customization, and tools, for example, as well as ASP.NET and Visual Studio.

As mentioned above, while exemplary embodiments of the present invention have been described in connection with various computing devices and network architectures, the underlying concepts may be applied to any computing device or system in which it is desirable to create and/or implement domain-specific programming models. Thus, the techniques for creation and/or implementation of domain-specific programming models in accordance with the present invention may be applied to a variety of applications and devices. While exemplary data formats, programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A computer that receives a blueprint and includes a processor programmed so as to execute program modules of a blueprint translator that produces source code from said blueprint, said program modules comprising:
   a parser that receives and parses the blueprint and code setting forth desired additions or changes in the source code produced from the blueprint, wherein the code setting forth desired additions or changes is user-written code for modifying the source code produced from the blueprint and wherein the blueprint comprises a domain-specific declarative programming language that declares a database mapping from a database table to fields in a class;
   a document object model for processes the parsed blueprint;
   a semantic analyzer that analyzes the semantics of the parsed and processed blueprint;
   a source code generator that generates source code responsive to the parsed and processed blueprint and the output of the semantic analyzer; and
   a compiler that compiles the generated source code with the code setting forth desired additions or changes so as to generate object code including the desired additions or changes specified by the code and that preserves the code after compilation for use the next time the generated source code is to be compiled.

2. The computer of claim 1, wherein the parser is an extensible markup language (XML) parser.

3. The computer of claim 1, wherein the source code generator generates the source code in accordance with predetermined schemas, patterns, or hierarchical rules.

4. The computer of claim 1, wherein the generated source code cannot be modified.

5. A method of generating source code from a blueprint, comprising:
   parsing the blueprint and code setting forth desired additions or changes in the source code generated from the blueprint, wherein the code setting forth desired additions or changes is user-written code for modifying the source code generated from the blueprint and wherein the blueprint comprises a domain-specific declarative programming language that declares a database mapping from a database table to fields in a class;
   processing the parsed blueprint in accordance with a document object model;
   analyzing the semantics of the parsed and processed blueprint;
   generating source code responsive to the analyzed parsed and processed blueprint;
   compiling the generated source code with the code setting forth desired additions or changes to generate object code including the desired additions or changes specified by the code; and
   preserving the code after compilation of the generated source code for use the next time the generated source code is to be compiled.

6. The method of claim 5, wherein parsing the blueprint comprises XML parsing the blueprint.

7. The method of claim 5, wherein generating the source code comprises generating the source code in accordance with predetermined schemas, patterns, or hierarchical rules.

8. The method of claim 5, wherein generating the source code comprises generating a read only source code file.

9. A method of generating a declarative programming model, comprising the steps of:
   receiving a blueprint comprising a domain-specific declarative programming language that declares a database mapping from a database table to fields in a class and receiving code setting forth desired additions or changes in source code generated from the blueprint, wherein the code setting forth desired additions or changes is user-written code for modifying the source code generated from the blueprint;
   translating the blueprint into source code;
   compiling the source code with the code setting forth desired additions or changes so as to generate object code including the desired additions or changes specified by the code, the declarative programming model corresponding to the object code; and
   preserving the code after generating the object code for use the next time the source code is to be compiled.

10. The method of claim 9, further comprising receiving at least one of an extension file and a source file including said code setting forth desired additions or changes, wherein generating the object code comprises compiling the source code and the at least one of an extension file and a source file.

11. The method of claim 9, wherein generating the object code comprises compiling the source code using a domain-specific compiler.

12. The method of claim 9, further comprising generating the blueprint in a data format.

13. The method of claim 12, wherein the data format is extensible markup language (XML).

14. The method of claim 9, further comprising receiving the code setting forth desired additions or changes from a separate file, and compiling the code with the source code to generate the object code.

15. The method of claim 9, further comprising embedding the code setting forth desired additions or changes into the blueprint prior to translating the blueprint into source code.

16. The method of claim 9, wherein translating the blueprint comprises determining at least one input stream to translate and a target language.

17. The method of claim 9, wherein translating the blueprint is performed in a language independent fashion.

18. A computer-readable medium having stored thereon computer executable instructions for performing a method of generating source code from a blueprint, the method comprising:
   parsing the blueprint and code setting forth desired additions or changes in the source code generated from the blueprint, wherein the code setting forth desired additions or changes is user-written code for modifying the source code produced from the blueprint and wherein the blueprint comprises a domain-specific declarative programming language that declares a database mapping from a database table to fields in a class;
   processing the parsed blueprint in accordance with a document object model;
   analyzing the semantics of the parsed and processed blueprint;
   generating source code responsive to the analyzed parsed and processed blueprint;

compiling the generated source code with the code setting forth desired additions or changes so as to generate object code including the desired additions or changes specified by the code; and preserving the code after compilation of the generated source code for use the next time the generated source code is to be compiled.

19. The computer-readable medium of claim 18, wherein parsing the blueprint comprises XML parsing the blueprint.

20. The computer-readable medium of claim 18, wherein generating the source code comprises generating the source code in accordance with predetermined schemas, patterns, or hierarchical rules.

21. The computer-readable medium of claim 18, wherein generating the source code comprises generating a read only source code file.

22. A computer-readable medium having stored thereon computer executable instructions for performing a method of generating a declarative programming model, the method comprising:

receiving a blueprint comprising a domain-specific declarative programming language that declares a database mapping from a database table to fields in a class and receiving code setting forth desired additions or changes in source code generated from the blueprint, wherein the code setting forth desired additions or changes is user-written code for modifying the source code generated from the blueprint;

translating the blueprint into source code;

compiling the source code with the code setting forth desired additions or changes so as to generate object code including the desired additions or changes specified by the code, the declarative programming model corresponding to the object code; and preserving the code after generating the object code for use the next time the source code is to be compiled.

23. The computer-readable medium of claim 22, having further computer-executable instructions for receiving at least one of an extension file and a source file including said code setting forth desired additions or changes, wherein generating the object code comprises compiling the source code and the at least one of an extension file and a source file.

24. The computer-readable medium of claim 22, wherein generating the object code comprises compiling the source code using a domain-specific compiler.

25. The computer-readable medium of claim 22, having further computer-executable instructions for generating the blueprint in a data format.

26. The computer-readable medium of claim 25, wherein the data format is extensible markup language (XML).

27. The computer-readable medium of claim 22, having further computer-executable instructions for receiving the code setting forth desired additions or changes from a separate file, and compiling the code with the source code to generate the object code.

28. The computer-readable medium of claim 22, having further computer-executable instructions for embedding the code setting forth desired additions or changes into the blueprint prior to translating the blueprint into source code.

29. The computer-readable medium of claim 22, wherein translating the blueprint comprises determining at least one input stream to translate and a target language.

30. The computer-readable medium of claim 22, wherein translating the blueprint is performed in a language independent fashion.

* * * * *